(12) United States Patent
Mansour et al.

(10) Patent No.: US 9,904,727 B2
(45) Date of Patent: *Feb. 27, 2018

(54) DOCUMENT RETRIEVAL/IDENTIFICATION USING TOPICS

(71) Applicant: Microsoft Technology Licensing, LLC, Redmond, WA (US)

(72) Inventors: Riham Hassan Abdel-Moneim Mansour, Cairo (EG); Ahmed Ael Mohamed Abdel Kader Ashour, Giza (EG); Hesham Saad Mohamed Abdelwahab El Baz, Alexandria (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,846

(22) Filed: Oct. 10, 2016

(65) Prior Publication Data

US 2017/0154100 A1    Jun. 1, 2017

Related U.S. Application Data

(63) Continuation of application No. 14/615,156, filed on Feb. 5, 2015, now Pat. No. 9,483,474.

(51) Int. Cl.
*G06K 9/00* (2006.01)
*G06F 17/30* (2006.01)

(52) U.S. Cl.
CPC .. *G06F 17/30663* (2013.01); *G06F 17/30011* (2013.01); *G06F 17/30613* (2013.01); *G06F 17/30713* (2013.01); *G06K 9/00* (2013.01)

(58) Field of Classification Search
CPC .. G06F 11/32; G06F 11/323; G06F 17/30011; G06F 17/30716; G06F 17/3089;
(Continued)

(56) References Cited

U.S. PATENT DOCUMENTS 6,012,074 A * 1/2000 Lucas ................... G06F 17/211
707/E17.008
6,144,962 A * 11/2000 Weinberg ................ G06F 11/32
(Continued)

OTHER PUBLICATIONS

"All Your Business Apps. One Social Experience", Published on Sep. 9, 2013, available at https://about.yammer.com/product/platform/.
(Continued)

*Primary Examiner* — Aklilu Woldemariam
(74) *Attorney, Agent, or Firm* — Schwegman Lundberg & Woessner, P.A.

(57) ABSTRACT

A system for retrieving/identifying a document comprising text stored in a document repository is described. A memory stores a graphical structure comprising a first plurality of nodes each representing a person, and a second plurality of nodes each representing a document in the document repository, the nodes being connected by edges according to automatically observed interactions between the represented people and documents. At least some of the nodes have one or more annotations each denoting a topic. A node relatedness calculator computes distances between nodes of the graphical structure using the topic annotations. An input receives an identifier of a user who is represented by one of the first plurality of nodes. An identifier/retriever identifies one or more documents from the document repository by using the identifier and using the computed distances between nodes.

20 Claims, 6 Drawing Sheets

(58) Field of Classification Search
CPC .......... G06F 2201/875; G06F 17/3069; G06F 17/30707; G06F 17/30663; G06F 17/218; G06F 17/30619; G06F 17/3071; G06F 17/30994; G06F 17/30722; G06F 3/0483; G06F 17/241; G06F 17/30; G06F 19/26; G06F 17/30616; G06F 17/30731; G06F 17/30979; G06F 17/30734; G06F 17/30873; G06F 17/30672; G06F 17/271; G06F 17/30613; G06F 17/30713; G06K 9/00483; G06K 9/6215; G06K 9/68; G06Q 30/02; G06Q 10/101; G06Q 50/01; G06Q 10/10; H04L 29/06; H04L 67/02; H04L 63/10; Y10S 707/956; Y10S 707/99944; Y10S 707/99942; Y10S 707/99943; Y10S 707/99933; Y10S 707/99945; Y10S 707/99948; G09B 29/00; G06T 11/206

USPC ........ 382/218, 305, 162; 707/737, 759, 722, 707/739, 810, 728, 732

See application file for complete search history.

(56) References Cited

U.S. PATENT DOCUMENTS

| | | | | |
|---|---|---|---|---|
| 6,341,310 | B1* | 1/2002 | Leshem | G06F 11/32 |
| | | | | 707/E17.116 |
| 6,775,677 | B1 | 8/2004 | Ando et al. | |
| 8,306,922 | B1* | 11/2012 | Kunal | G06Q 30/02 |
| | | | | 705/319 |
| 9,135,285 | B1* | 9/2015 | Johnson | G06F 17/30312 |
| 2003/0182310 | A1* | 9/2003 | Charnock | G06F 17/30716 |
| 2004/0024739 | A1* | 2/2004 | Copperman | G06F 17/30616 |
| 2004/0177069 | A1* | 9/2004 | Li | G06F 17/30017 |
| 2010/0100543 | A1* | 4/2010 | Brady | G06F 17/30613 |
| | | | | 707/732 |
| 2010/0106719 | A1* | 4/2010 | Donato | G06F 17/3071 |
| | | | | 707/728 |
| 2010/0241639 | A1* | 9/2010 | Kifer | G06F 17/30616 |
| | | | | 707/754 |
| 2011/0078215 | A1* | 3/2011 | Oberle | G06F 17/30734 |
| | | | | 707/810 |
| 2011/0302168 | A1* | 12/2011 | Aggarwal | G06F 17/30619 |
| | | | | 707/739 |
| 2012/0233151 | A1* | 9/2012 | Vanderwende | G06F 17/30873 |
| | | | | 707/722 |
| 2013/0132138 | A1 | 5/2013 | Doganata et al. | |
| 2013/0144916 | A1* | 6/2013 | Lum | G06F 19/24 |
| | | | | 707/790 |
| 2014/0074876 | A1 | 3/2014 | Venkataramani et al. | |
| 2014/0170729 | A1 | 6/2014 | Cheng | |
| 2014/0195534 | A1 | 7/2014 | Diament et al. | |
| 2016/0232157 | A1 | 8/2016 | Mansour et al. | |

OTHER PUBLICATIONS

"Big Data Integration" published on Jan. 30, 2012, available at http://bigdataintegration.blogspot.in/2012_01_01_archive.html.

Carr, David F. "Yammer Promoted Enterprise Solution to Social Silos" published on Oct. 29, 2012, available at http://www.informationweek.com/enterprise/yammer-promotes-enterprise-graph-solution-to-social-silor/d/d-id/1107111?.

Cataldi, et al., "Emerging Topic Detection on Twitter based on Temporal and Social Terms Evaluation" In Proceedings of the Tenth International Workshop on Multimedia Data Midning, Jul. 25, 2010, 10 pages.

Engel, et. al., "Expert search in semantically annotated enterprise data: integrating query dependent and query independent relevance factors", In Lernen, Wissen, Adaption Conference, Oct. 7, 2013, 4 pages.

"Giant Enterprise Graph—Antidot", In Proceedings of 11th International Semantic Web Conference, Jan. 27, 2012, 37 pages.

"Introducing Delve (codename Oslo) and the Office Graph", published on Mar. 11, 2014, available at: http://blogs.office.com/2014/03/11/introducing-codename-oslo-and-the-office-graph/.

Office action for U.S. Appl. No. 14/615,156, dated Feb. 25, 2016, Abdel-Moneim Mansour et al., "Document Retrieval/Identification Using Topics", 17 pages.

Pecovnik, Simon "Enterprise Graph Search—take 1", published on Jan. 28, 2014, available at http://www.ranvn.co.uk/enterprise-graph-search-take-1/.

"Notice of Allowance Issued in U.S. Appl. No. 14/615,156", dated Jul. 1, 2016, 11 pages.

* cited by examiner

DOCUMENT RETRIEVAL/IDENTIFICATION USING TOPICS

This Application claims priority to 14/615,156, filed Feb. 5, 2015, which is incorporated herein by reference.

BACKGROUND

There is an ongoing need to improve the relevance of documents retrieved from document repositories in response to user queries. Knowledge workers and others who need to access and retrieve content are often frustrated when search results are not relevant to the task in hand and the time lost as a result impacts productivity. In addition, there is a need to enable individuals to receive recommendations of other individuals and/or documents to enable relevant people and documents to be found quickly and efficiently when faced with tasks.

Document retrieval, where document repositories comprise huge numbers of documents, is a non-trivial task since any solution must scale up in a robust and efficient manner so that practical, working solutions are enabled. Many existing solutions trade off relevance against the ability to scale, so that large scale systems often retrieve documents which are not as relevant. In the same way, recommendation systems can also suffer from this drawback.

The embodiments described below are not limited to implementations which solve any or all of the disadvantages of known document retrieval/identification systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A system for retrieving/identifying a document comprising text stored in a document repository is described. A memory stores a graphical structure comprising a first plurality of nodes each representing a person, and a second plurality of nodes each representing a document in the document repository, the nodes being connected by edges according to automatically observed interactions between the represented people and documents. At least some of the nodes have one or more annotations each denoting a topic. A node relatedness calculator computes distances between nodes of the graphical structure using the topic annotations. An input receives an identifier of a user who is represented by one of the first plurality of nodes. An identifier/retriever identifies one or more documents from the document repository by using the identifier and using the computed distances between nodes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The term "document" is used to refer to a content item comprising text. A non-exhaustive list of examples is: news article, email, blog entry, online encyclopedia entry, web page, slide presentation, book, article, social network feed, or other text document.

The term "topic" is used to refer to a title of a concept or subject. For example, a topic may comprise one to four words describing a concept or subject.

Figure 1:
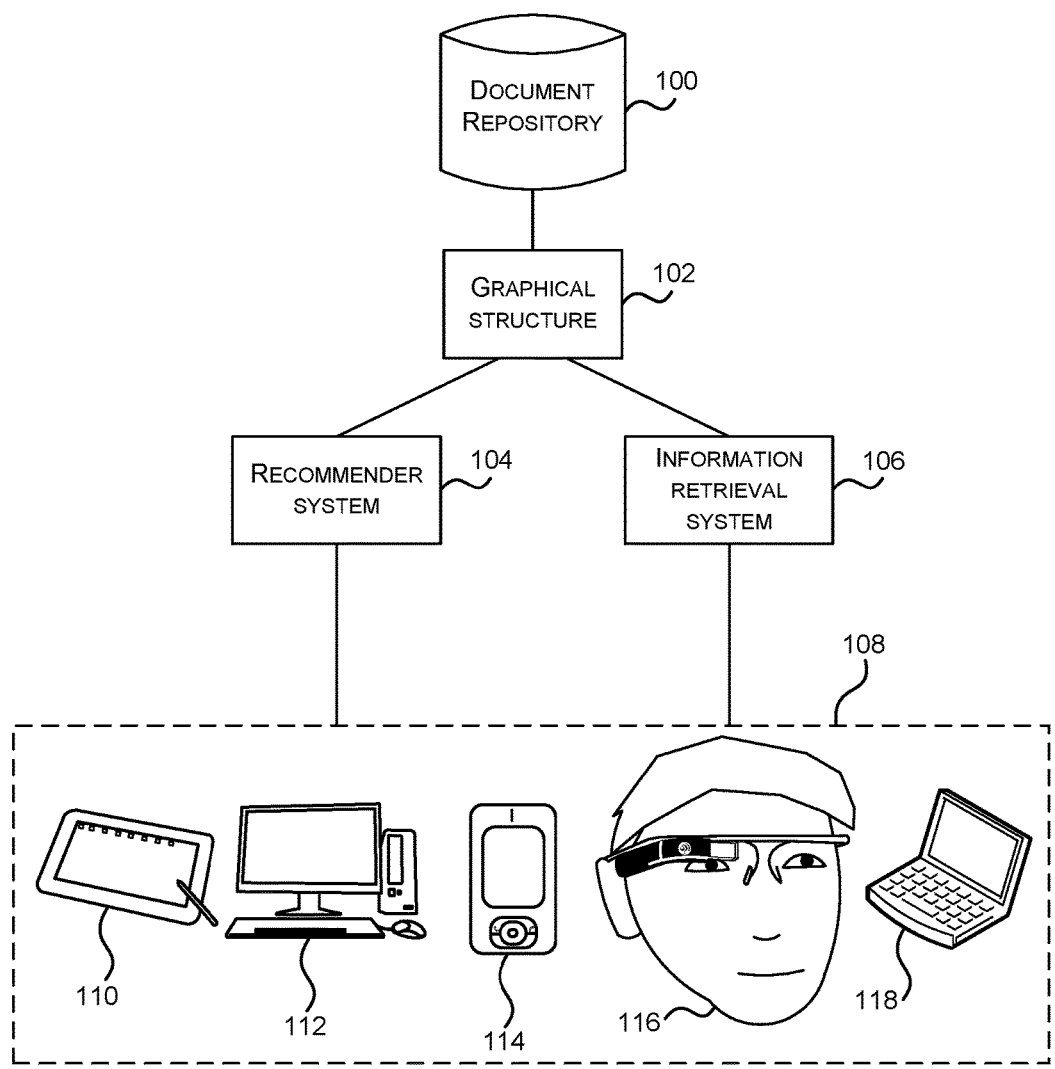
FIG. 1 is a schematic diagram of document retrieval and/or recommendation apparatus accessed by end user equipment.

FIG. 1 is a schematic diagram of document retrieval and/or recommendation apparatus comprising a memory storing a graphical structure 102, a recommender system 104 and an information retrieval system 106. Both the information retrieval system 106 and the recommender system 104 are able to access the graphical structure 102 to improve relevance of their output, and to enable more efficient and robust operation for huge document repositories such as document repository 100. For example, people and/or documents are recommended to a user, by recommender system 104, which sends its recommendations to end user equipment such as that illustrated in box 108 of FIG. 1. For example, documents are retrieved from document repository 100 by information retrieval system 106 which sends its results to end user equipment 108 such as tablet computer 110, desktop computer 112, smart phone 114, wearable computer 116, laptop computer 118. Only one document repository 100 is illustrated in FIG. 1 for clarity although in practice many different document stores may be present at different locations accessible to the information retrieval system 106 and/or recommender system 104.

The graphical structure 102 is described in more detail with respect to FIG. 2 below. It is formed from information about people, and information about documents authored or consumed by those people. For example, a document is consumed by a person when it is retrieved, opened, printed, copied, or sent. The graphical structure is formed automatically by observing document authoring and consumption activity of consenting users. For example, by monitoring requests received at document stores, by automatically observing document editing and by observing documents sent using email. The graphical structure is also formed by automatically observing relationships between people, such as members of an enterprise, who have opted-in to allow their behavior to be observed and used in this way. For example, the exchange of emails between people may be used as evidence of a relationship between those people as may be the occurrence of meetings. Enterprise organization charts and similar records may also be automatically accessed to calculate relationships between people.

The examples described in this document involve using a new type of graphical structure where the nodes, each of which represent either a person or a document, are annotated with topics. The annotated graphical structure is used to improve the relevance of documents retrieved in response to a query, and/or to improve the relevance of people and/or documents recommended to users. By using a graphical structure annotated with topics an efficient and scalable solution is achieved. The solution is also robust in that it does not easily break down in situations where there is little data available, where documents are wrongly annotated, or where the graphical structure has errors due to out of date information or other problems. In various examples, the annotations are updated over time as the graphical structure changes. In various examples, the topics of a node are identified from sources outside the documents represented by the node (in the case of a document node) or used to calculate how to connect the node edge (in the case of a person node). By using sources outside the documents it is possible to have a topic annotating a document, where the topic itself does not appear in the text of the document. For example, in the case of the topic "wild animals" the words "wild animals" may not occur in a document annotated with that topic, although the words "foxes, badgers and stoats" may occur in the document. This ability to use both topics from within the text and those which are outside the document (out-of-text topics) enables highly relevant results to be achieved in a fast, efficient and robust manner. Previous approaches for calculating topics from documents have used documents where the topics are already identified by human users, for example, documents from online encyclopedias where titles of the documents written by human authors, serve as topic titles. However, in various examples described in this document topics are calculated in an automated manner using machine learning technology. By careful selection of document sources from which the topics are automatically calculated, the graphical structure may be tailored to particular application domains. For example, by using document sources of a given enterprise, the topics which are automatically calculated, are from a topic pool which is highly relevant for the given enterprise.

Figure 2:
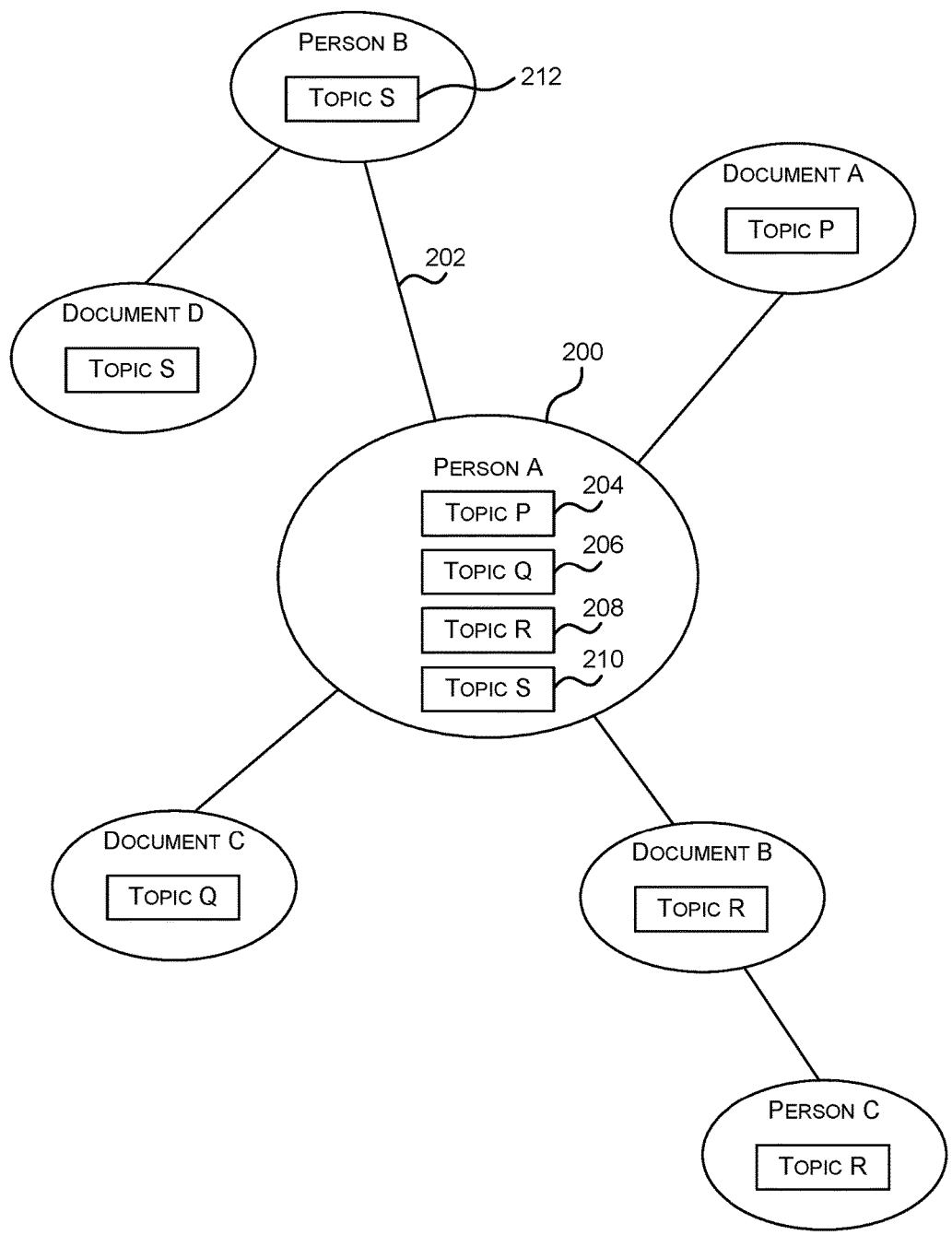
FIG. 2 is a schematic diagram of an example of part of a graphical structure used in the apparatus of FIG. 1.

FIG. 2 is a schematic diagram of an example of part of a graphical structure used in the apparatus of FIG. 1. The graphical structure comprises a plurality of nodes 200 shown as blobs in FIG. 2, connected by edges 202 shown as lines in FIG. 2. A node represents either a person or a document. A node representing a person comprises at least an identifier of the person or an identifier of one or more end user devices associated with the person. A node representing a document comprises at least an identifier of the document such as an address at which the document is stored in document repository 100.

A node representing a person is connected to a node representing another person, where a relationship has been observed between those people. For example, because the people are attendees at a meeting observed from an online calendar appointment, because the people are related in an organization chart of an enterprise or other organization, because emails are observed between the people or for other reasons. A node representing a document is connected to a person where the person is observed to author or consume the document. A node representing a document may be connected to another node representing a document, where the documents are related. For example, one document cites the other document or has a link to the other document.

The example shown in FIG. 2 is part of a graphical structure. In practice many more nodes and edges are present such that a huge number of people and documents are represented. Since each node may be stored in an extremely compact manner and the edges may be represented by pointers or links, the graphical structure is highly scalable.

In the examples described herein, nodes representing people are annotated with zero, one or more topics. For example, in FIG. 2 the node representing person B is annotated with topic S 212. The node representing person A is annotated with topic P 204, topic Q 206, topic R 208 and topic S 210. Nodes representing documents are also annotated with zero, one or more topics. For example, document D in FIG. 2 is annotated with topic S. New methods for calculating the topics of a person node or document node are described herein. For a given document, topics calculated for that document may be stored as annotations to the graph node for the document, by storing metadata associated with the document, and/or may be stored by modifying the document itself to add the annotations.

Figure 3:
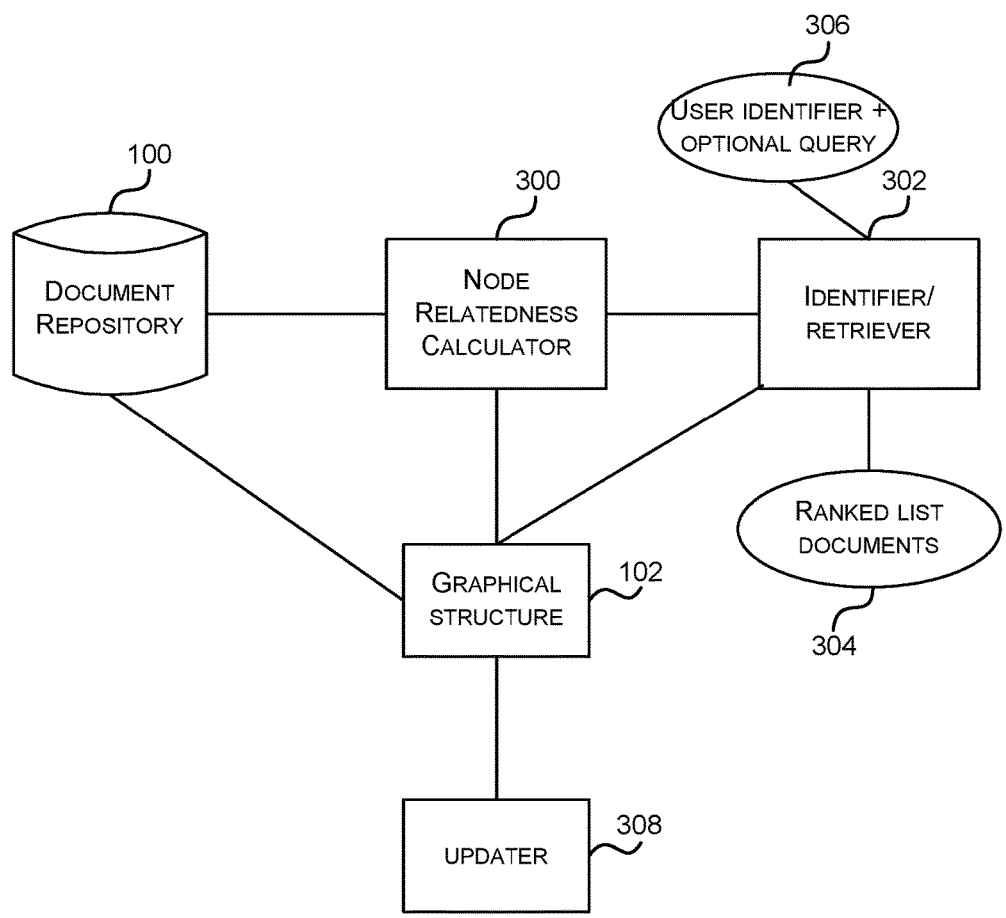
FIG. 3 is a schematic diagram of a method of using a graphical structure, such as that of FIG. 2, for retrieval and/or identification of documents and/or people.

FIG. 3 is a schematic diagram of a method of using a graphical structure, such as that of FIG. 2, for document retrieval and/or identification. The graphical structure is constructed as described above and comprises topic annotations. The documents represented by the document nodes of the graphical structure 102 are stored in document repository 100 which may comprise different stores at different locations.

A node relatedness calculator 300 has access to the graphical structure 102 and computes distances between nodes in the graphical structure as explained in more detail below. The distances are input to a document retriever/identifier 302. The document retriever/identifier outputs a ranked list of documents 304 of the document repository 100 which are identified as being relevant to a particular user, or which are computed in response to a query received from a particular user. In some examples the document retriever/identifier outputs a ranked list of nodes of the graphical structure 102 which represent people. The query may comprise one or more words. In some examples the document retriever/identifier sends a message to end user equipment with details of people and/or documents of the graphical structure 102 a user of the end user equipment may be interested in. In some examples the output of the document retriever/identifier comprises marked or highlighted nodes in a graphical representation of at least part of the graphical structure 102.

The node relatedness calculator is computer implemented using software and/or hardware and comprises algorithms for computing distances between nodes in the graphical structure 102. The distances may take into account the number of edges on a shortest path between two nodes, weights associated with the edges, the number of paths between two nodes, and other factors. The distances may also take into account topic annotations of the nodes.

The document retriever/identifier 302 is computer implemented using software and/or hardware. It receives input comprising an identifier 306 of a user or end user equipment represented by a person node in the graphical structure 102. It optionally receives input comprising a query of the user or end user equipment.

The document retriever/identifier locates in the graphical structure the node representing the user or end user equipment by using identifier 306.

The algorithms may comprise searching the graph for all nodes a specified number of hops away, where a hop is a traversal of one edge. The algorithms may take into account weights associated with the edges and/or topics annotations of the nodes. The content recommender 302 may be configured to receive input comprising a document node. For example, where a document is managed by an automated document management system. The algorithms may compute documents and/or people to be recommended to end user equipment which accesses the document.

In some examples the node relatedness calculator 300 and graphical structure 102 are used by an information retrieval system. For example, the information retrieval system receives a query from a user who has consented to being represented in the graphical structure 102. The information retrieval system identifies a person node representing the user in the graphical structure 102, for example, using an identifier of end user equipment from which the query is received. It searches for documents represented in the graphical structure 102 which are related to the query. The search takes into account topic annotations of the nodes and may use node relatedness calculator 300. The query usually retrieves the documents that has partial exact match to the query words. With the addition of the semantic annotation of the nodes with the topics that are not necessarily mentioned literally in the node document, the query words can match either exact words in the document or some of its annotated topics. This raises the possibility of the query retrieving more semantically relevant results. The same concept applies to the person node where the query words are matched with the documents associated with the person. With topic annotation of these documents, the query can match some document semantically and hence can match a person node semantically.

An updater 308 is configured to update the graphical structure 102 by adding, editing or deleting nodes and/or edges. The updater is also configured to update topic annotations of the graphical structure by adding, editing or deleting annotations. The updater 308 may operate in batch mode or by making incremental updates. For example, the updater 308 automatically observes document authoring or consumption events, detects topics of the documents associated with the events and updates the graph nodes, edges and annotations accordingly.

Figure 4:
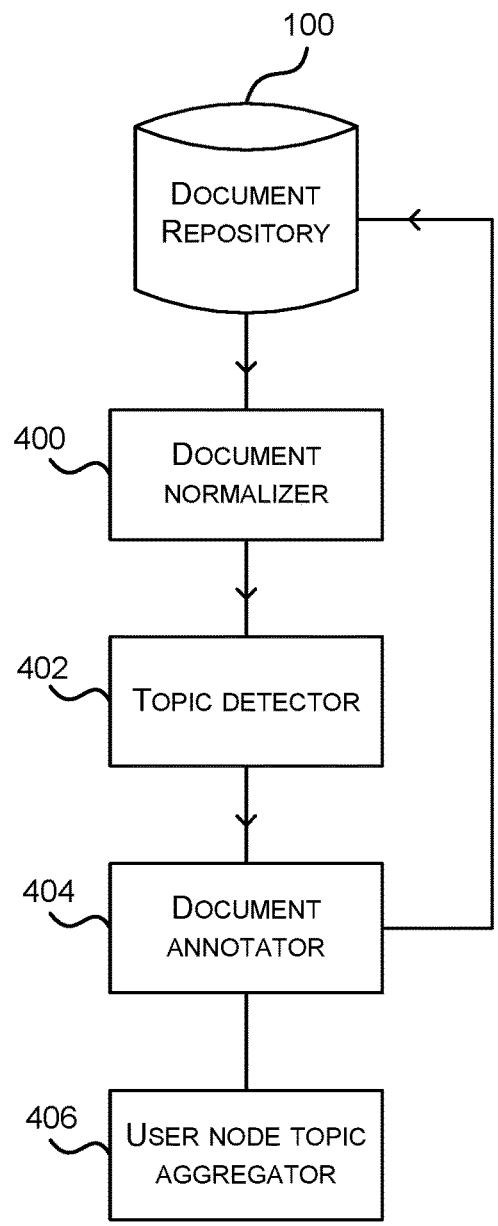
FIG. 4 is a schematic diagram of apparatus for annotating documents and nodes of a graphical structure.

FIG. 4 is a schematic diagram of apparatus for annotating documents and for annotating nodes of a graphical structure, such as that of FIG. 2, with topics. The apparatus comprises a document normalizer 400, a topic detector 402, a document annotator 404 and a user node topic aggregator 406 each of which are computer implemented using software and/or hardware. The document normalizer receives a document from the document repository 100 and normalizes the document, for example, by translating it into a particular language, by removing images, by removing hyperlinks or in other ways. The main functionality of the normalizer is to transform the different document formats like PDF, PPT, DOC, etc. files into one single format that the rest of the topic detector can understand.

The topic detector 402 receives the normalized text of the document and calculates one or more topics associated with the document. The topics may be in-text topics (which appear in the normalized text of the document) and/or out of text topics (which do not occur in the normalized text of the document). The way in which the topic detector works is described in more detail with reference to FIG. 5. It makes use of a weighted inverted index having rows comprising words and columns comprising topics, and which is calculated from a document corpus that may be selected for the particular application domain. By using the weighted inverted index, out of text topics are identified for a given document.

The topic detector identifies topics of a document and passes these to a document annotator 404 which stores the topics as annotations in the graphical structure (such as that of FIG. 2) and may also annotate the actual documents themselves in the document repository 100 as indicated by the arrow in FIG. 4.

A user node topic aggregator takes as input the topics computed for a plurality of documents authored or consumed by the user. The user node topic aggregator may merge, aggregate or select from the topics of the documents authored or consumed by the user. In this way the number of topics annotating a node representing a given person is prevented from becoming overly large. For example, topics most frequently identified with respect to documents authored and/or consumed by the person are selected. This process favors overlapping topics between multiple documents. For the rest of non-overlapping documents, semantic similarity distance measures like Jensen-Shannon divergence, cosine similarity or distance between embeddings of the topics may be used. The user node is annotated with the aggregated, merged or selected topics.

Figure 5:
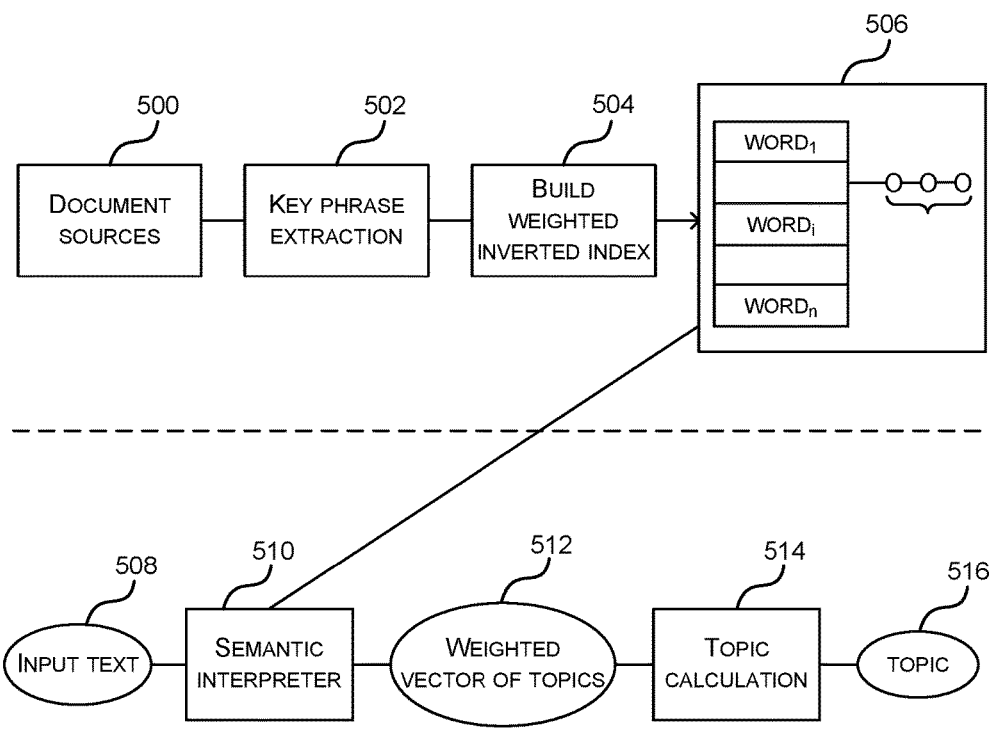
FIG. 5 is a schematic diagram of a method of building a semantic interpreter comprising a weighted inverted index, and of using the semantic interpreter to compute topics from input text.

FIG. 5 is a schematic diagram of a method of building a semantic interpreter comprising a weighted inverted index, and of using the semantic interpreter to compute topics from input text. The top part of FIG. 5, above the dotted line, illustrates process for building the semantic interpreter (comprising an inverted index). The lower part of FIG. 5, below the dotted line, illustrates process for using the semantic interpreter to compute topics.

One or more document sources 500 are selected according to the application domain. For example, where the information retrieval system and recommender system are for use in an enterprise, the document sources may comprise document sources typically used by the enterprise such as news articles, blogs, emails, document stores and others.

Documents from the selected document sources 500 are accessed and key phrases are extracted 502 from the accessed documents. This process may comprise parsing the accessed documents to obtain combinations of two or three consecutive words observed in the accessed documents. Two consecutive words is referred to as a bigram. Three consecutive words is referred to as a trigram. Quadgrams or other larger numbers of consecutive words may also be used. The term "n-gram" is used to refer to two or more consecutive words.

Features of the observed n-grams may be found such as location within the document (such as whether the n-gram is in the title, summary, abstract, conclusion, or in the body of the document), whether capitalization is used, the length of the n-gram in terms of number of characters, or other features. These features, together with the observed n-gram, are input to a trained classifier which classifies the n-grams as being topics or not topics. For example, the classifier may be a neural network, a support vector machine, a random decision forest, or other classifier which has been trained to classify n-grams as being topics or not.

For each topic, context is computed by extracting text from documents in which the topics are found. The context comprises individual words which occur in text where topics have been found. The context words may be ranked by frequency of occurrence for a given topic and the most frequently occurring context words selected.

A weighted inverted index is then computed 504 which comprises one column for each topic n-gram, and one row for each context word. The cells of the index are populated with numerical values or scores representing frequency of co-occurrence of the topic n-gram and the context n-gram in the documents of the document sources. The scores may be normalized. In FIG. 5 the weighted inverted index 506 is depicted as a column of words, each word having an associated weighted vector (or list) of topics (depicted as nodes connected by lines and shown for only one cell rather than each cell, for clarity). That is, the columns are collapsed into a single column.

The weighted inverted index, also referred to as a semantic interpreter 510 is used as shown in the lower part of FIG. 5. Input text 508 is received, from a document of document repository 100 (see FIG. 1). The semantic interpreter 510 extracts a word from the input text 508, looks up the word in memory storing the weighted inverted index 506 and finds the weighted vector of topics stored with the indexed word in the memory. The weighted vector of topics is input to a topic calculation apparatus 514 which is computer implemented using software and/or hardware. Many other words from the document are also extracted as input text 508 and used to find weighted vectors of topics 512 as explained above. The topic calculation apparatus 514 thus receives many weighted vectors of topics for a single document. The topic calculation apparatus 514 uses the weighted vectors of topics to calculate at least one topic 516 and annotates the document with the topic 516. The topic calculation apparatus 514 uses any suitable aggregation or selection process to calculate the topic 516, or a ranked list of topics, from the weighted vectors of topics.

The weighted inverted index may be updated in order to take into account changes in the documents of the document sources. For example as popular topics change over time within a particular organization or enterprise. The update may be achieved by computing a second weighted inverted index whilst a first weighted inverted index is in use. The second weighted inverted index may then be used to replace the first weighted inverted index. In another example, incremental updates are made to an existing weighted inverted index. In this case the frequency counts of the observed co-occurrence of topic titles and context words are updated in the existing weighted inverted index as new documents are observed. New columns and rows are added to the existing weighted inverted index in the case that new topics are observed.

Alternatively, or in addition, the functionality of all or part of the weighted inverted index, node relatedness calculator, graphical structure, updater, and identifier/retriever described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 6:
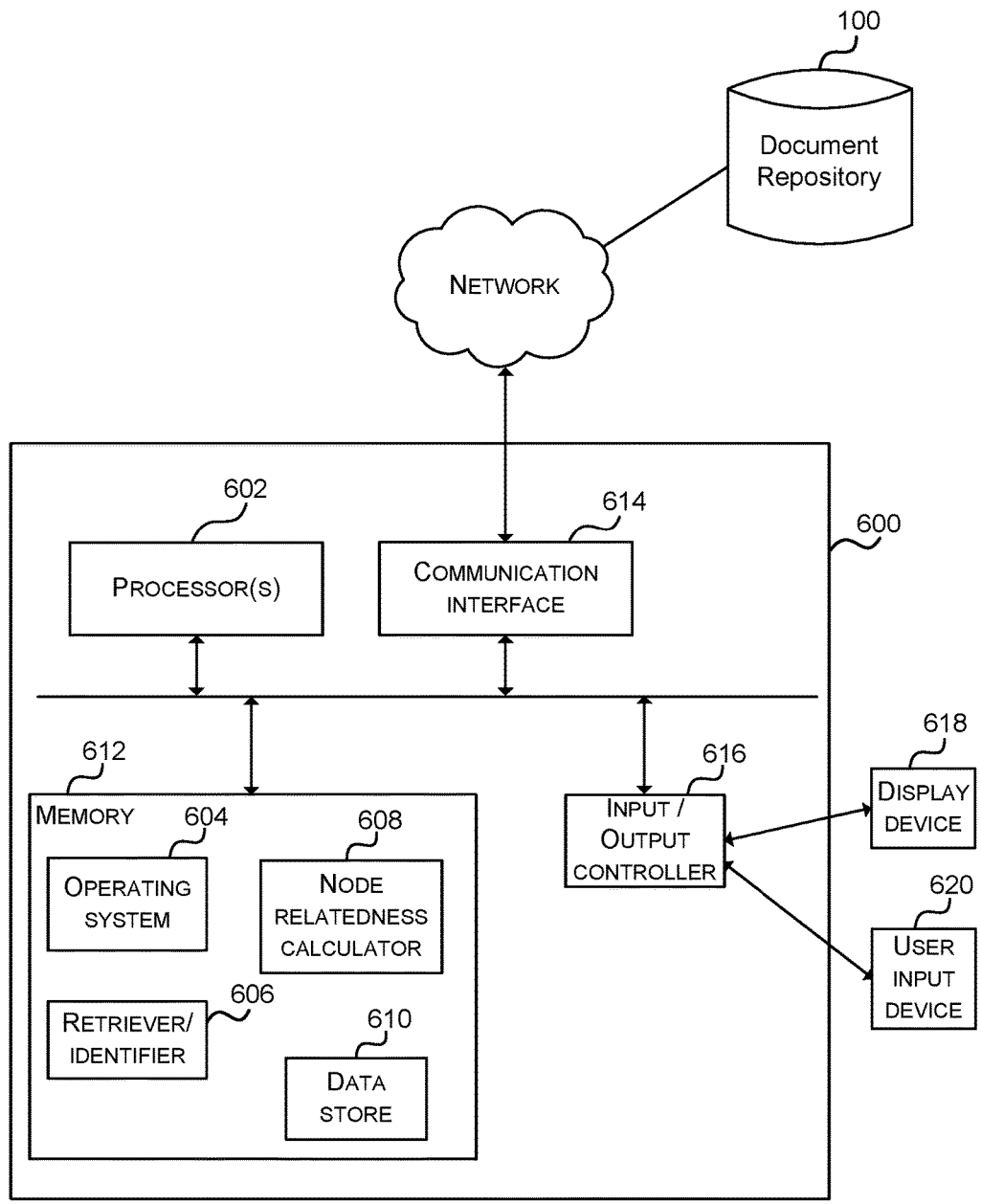
FIG. 6 illustrates an exemplary computing-based device in which embodiments of a document/person retrieval and/or recommendation system may be implemented.

FIG. 6 illustrates various components of an exemplary computing-based device 600 which may be implemented as any form of a computing and/or electronic device, and in which embodiments of a recommender system and/or information retrieval system using a graphical structure comprising nodes representing documents and nodes representing people, where at least some nodes are annotated with topics, may be implemented.

Computing-based device 600 comprises one or more processors 602 which may be microprocessors, controllers or any other suitable type of processors for processing computer executable instructions to control the operation of the device in order to retrieve ranked lists of documents from a document repository such as document repository 100, and/or to compute documents and/or people to be recommended to users. The one or more processors may also process computer executable instructions to control operation of the device in order to compute topics of documents and/or people, for example, using a weighted inverted index that has been formed without human identified topics. In some examples, for example where a system on a chip architecture is used, the processors 602 may include one or more fixed function blocks (also referred to as accelerators) which implement a part of the method of any of FIGS. 3 to 5 in hardware (rather than software or firmware). Platform software comprising an operating system 604 or any other suitable platform software may be provided at the computing-based device to enable application software to be executed on the device. In some examples, the computer executable instructions may comprise software providing a node relatedness calculator 608 and associated content recommender as described above with reference to FIG. 3 and which is able to access a graphical structure which may be stored at data store 610 or at another location accessible to the computing based device 600. A retriever/identifier 606 may be provided at memory 612 to implement the functionality of the retriever/identifier of FIG. 3.

The computer executable instructions may be provided using any computer-readable media that is accessible by computing based device 600. Computer-readable media may include, for example, computer storage media such as memory 612 and communications media. Computer storage media, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 612) is shown within the computing-based device 612 it will be appreciated that the storage may be distributed or located remotely and accessed via a network or other communication link (e.g. using communication interface 614).

The computing-based device 600 also comprises an input/output controller 616 arranged to output display information to a display device 618 which may be separate from or integral to the computing-based device 600. The display information may provide a graphical user interface. The input/output controller 616 is also arranged to receive and process input from one or more devices, such as a user input device 620 (e.g. a mouse, keyboard, camera, microphone or other sensor). In some examples the user input device 620 may detect voice input, user gestures or other user actions and may provide a natural user interface (NUI). This user input may be used to edit the graphical structure, view the graphical structure, add new graphical structures, delete graphical structures, specify ranking algorithms to be used, specify criteria or thresholds to be used by the node relatedness calculator, and for other purposes. In an embodiment the display device 618 may also act as the user input device 620 if it is a touch sensitive display device. The input/output controller 616 may also output data to devices other than the display device, e.g. a locally connected printing device.

Any of the input/output controller 616, display device 618 and the user input device 620 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In an example a system is describe for retrieving/identifying a document comprising text stored in a document repository comprising:

a memory storing a graphical structure comprising a first plurality of nodes each representing a person, and a second plurality of nodes each representing a document in the document repository, the nodes being connected by edges according to automatically observed interactions between the represented people and documents, at least some of the nodes having one or more annotations each denoting a topic;

a node relatedness calculator arranged to compute distances between nodes of the graphical structure using the topic annotations;

an input arranged to receive at least an identifier of a user who is represented by one of the first plurality of nodes; and an identifier/retriever arranged to identify one or more documents from the document repository by using the identifier and using the computed distances between nodes.

For example, the memory stores the graphical structure with annotations to nodes at least some of which are words which do not occur in the text of the document represented by the node.

In examples, the identifier/retriever is arranged to identify the one or more documents by using the identifier to locate one of the first plurality of nodes by comparing the identifier and data stored with the first plurality of nodes.

In the example immediately above the node relatedness calculator is arranged to compute the distances from the located one of the first plurality of nodes to other nodes in the graphical structure.

For example, the identifier/retriever is arranged to identify one or more second ones of the first plurality of nodes by using the identifier and using the computed distances between nodes.

In various examples, the input is arranged to receive a query from end user equipment of the user, and wherein the identifier/retriever is arranged to identify the one or more documents from the document repository by using the query.

The system described above may comprise a topic detector arranged to automatically detect at least one topic of a document of the document repository and to save the topic as an annotation of a node of the graphical structure and/or as an annotation of the document in the document repository.

The system described above may comprise a topic detector arranged to automatically detect at least one topic of a document of the document repository using an index of words, where words in the index have a plurality of associated topics weighted using frequency of observed co-occurrence of the word and associated topics.

The system described in the paragraph immediately above may comprise the index, the index having been constructed automatically without human identification of topics.

In some examples the system described above comprises a user node topic aggregator arranged to aggregate or select amongst topics of documents of the document repository which have been authored or consumed by the same user, the topics of the authored or consumed documents having been automatically detected by the topic detector.

In some examples the system described above comprises an updater arranged to update the graphical structure by adding, editing or deleting nodes and/or edges of the graph according to automatically observed document authoring and document consumption events.

For example, the updater is arranged to update the graphical structure by adding, editing or deleting the annotations.

Another example provides a computer-implemented method of retrieving/identifying a document comprising text stored in a document repository comprising:

storing, at a memory, a graphical structure comprising a first plurality of nodes each representing a person, and a second plurality of nodes each representing a document in the document repository, the nodes being connected by edges according to automatically observed interactions between the represented people and documents, at least some of the nodes having one or more annotations each denoting a topic;

computing, at a processor, distances between nodes of the graphical structure using the topic annotations;

receiving an identifier of a user who is represented by one of the first plurality of nodes; and automatically identifying one or more documents from the document repository by using the identifier and using the computed distances between nodes.

The above method may comprise storing the graphical structure with annotations to nodes at least some of which are words which do not occur in the text of the document represented by the node.

The above method may comprise automatically detecting at least one topic of a document of the document repository using an index of words, where words in the index have a plurality of associated topics weighted using frequency of observed co-occurrence of the word and associated topics in a corpus of documents which is the same or different from the document repository.

The method may comprise updating the index by observing co-occurrence of words and associated topics in new documents.

In another example there is provided one or more device-readable media with device-executable instructions that, when executed by a computing system, direct the computing system to perform steps comprising:

storing, at a memory, a graphical structure comprising a first plurality of nodes each representing a person, and a second plurality of nodes each representing a document in the document repository, the nodes being connected by edges according to automatically observed interactions between the represented people and documents, at least some of the nodes having one or more annotations each denoting a topic;

computing, at a processor, distances between nodes of the graphical structure using the topic annotations;

receiving an identifier of a user who is represented by one of the first plurality of nodes; and automatically identifying one or more documents from the document repository, or people from the graphical structure, by using the identifier and using the computed distances between nodes.

The one or more device-readable media of mentioned above, with device-executable instructions that, when executed by a computing system, direct the computing system to perform steps comprising storing the graphical structure with annotations to nodes at least some of which are words which do not occur in the text of the document represented by the node.

The one or more device-readable media of mentioned above with device-executable instructions that, when executed by a computing system, direct the computing system to perform steps comprising identifying the one or more documents by using the identifier to locate one of the first plurality of nodes by comparing the identifier and data stored with the first plurality of nodes.

The one or more device-readable media of mentioned above with device-executable instructions that, when executed by a computing system, direct the computing system to perform steps comprising computing the distances from the located one of the first plurality of nodes to other nodes in the graphical structure.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising:
    a memory storing a graphical structure comprising a first node representing a person, and a second node representing a document in a document repository, the nodes being connected by an edge according to an automatically observed interaction between the person represented by the first node and the document represented by the second node, at least one of the nodes having a topic annotation denoting a topic, the interaction based at least in part on at least one of:
    a consumption activity by the person represented by the first node of the document represented by the second node, or
    a relationship between the person represented by the first node, and a second person represented by a third node;
    a node relatedness construct to calculate a distance between two nodes of the graphical structure;
    an input arranged to receive at least an identifier of a user who is represented by the first node; and
    an identifier/retriever arranged to identify one or more documents from the document repository by using the identifier and using the calculated distances between the two nodes.

2. The system of claim 1 wherein the annotation includes a word that does not occur in the text of the document represented by the second node.

3. The system of claim 1 wherein the identifier/retriever is arranged to identify the one or more documents by using the identifier to locate the node representing the person from a plurality of nodes representing people by comparing the identifier and data stored with individual of the plurality of nodes representing people.

4. The system of claim 1 wherein the node relatedness construct is arranged to calculate the distance based at least on the topic annotation.

5. The system of claim 3 wherein the identifier/retriever is arranged to identify the node representing the second person from the plurality of nodes representing people by using an algorithm including the identifier and the calculated distances between nodes.

6. The system of claim 1 wherein the input is arranged to receive a query from end user equipment associated with the user, and wherein the identifier/retriever is arranged to identify the one or more documents from the document repository by using the query.

7. The system of claim 1, further comprising a topic detector arranged to automatically detect at least one topic of a document of the document repository and to save the topic as an annotation of a node of the graphical structure and/or as an annotation of the document in the document repository.

8. The system of claim 1 comprising a topic detector arranged to automatically detect at least one topic of a document of the document repository using an index of words, where words in the index have a plurality of associated topics weighted using frequency of observed co-occurrence of the word and associated topics.

9. The system of claim 8, further comprising the index, the index having been constructed automatically without human identification of topics.

10. The system of claim 7, further comprising a user node topic aggregator arranged to aggregate or select amongst topics of documents of the document repository which have been authored or consumed by the same user, the topics of the authored or consumed documents having been automatically detected by the topic detector.

11. The system of claim 1, further comprising an updater arranged to update the graphical structure by adding, editing or deleting nodes and/or edges of the graph according to automatically observed document authoring and/or document consumption events.

12. The system of claim 11 wherein the updater is arranged to update the graphical structure by adding, editing or deleting the annotations.

13. A computer-implemented method comprising:
    storing, at a memory, a graphical structure comprising a first nodes representing a person, and a second node representing a document in a document repository, the nodes being connected by an edge according to an automatically observed interaction between the represented people person and the represented document, at least one of the nodes having an annotation denoting a topic, the interaction based at least in part on at least one of:
    a consumption activity by the person represented by the first node of the document represented by the second node, or
    a relationship between the person represented by the first node, and a second person represented by a third node;
    computing, at a processor, a distance between two nodes of the graphical structure;
    receiving an identifier of a user who is represented by the first node; and
    automatically identifying one or more documents from the document repository by using the identifier and using the computed distances between the two nodes.

14. The method of claim 13, further comprising storing the graphical structure with an annotation including a word that does not occur in the text of the document represented by the second node.

15. The method of claim 13 comprising automatically detecting at least one topic of a document of the document repository using an index of words, where words in the index have a plurality of associated topics weighted using frequency of observed co-occurrence of the word and associated topics in a corpus of documents which is the same or different from the document repository.

16. The method of claim 15 comprising updating the index by observing co-occurrence of words and associated topics in new documents.

17. One or more device-readable storage media with device-executable instructions that, when executed by a computing system, direct the computing system to perform steps comprising:
    storing, at a memory, a graphical structure comprising a first node representing a person, and a second node representing a document in the document repository, the nodes being connected by an edge according to automatically observed interactions between the represented person and the represented document, at least one of the nodes having an annotation denoting a topic, the interaction based at least in part on at least one of:
    a consumption activity by the person represented by the first node of the document represented by the second node, or
    a relationship between the person represented by the first node, and a second person represented by a third node;
    computing, at a processor, distances between two nodes of the graphical structure;

receiving an identifier of a user who is represented by the first node; and automatically identifying one or more documents from the document repository, or people from the graphical structure, by using the identifier and using the computed distances between the two nodes.

18. The one or more device-readable storage media of claim 17 with device-executable instructions that, when executed by a computing system, direct the computing system to perform steps comprising storing the graphical structure with an annotation including a word that does not occur in the text of the document represented by the second node.

19. The one or more device-readable storage media of claim 17 with device-executable instructions that, when executed by a computing system, direct the computing system to perform steps comprising identifying the one or more documents by using the identifier to locate the first node by comparing the identifier and data stored with the first node.

20. The one or more device-readable storage media of claim 17 with device-executable instructions that, when executed by a computing system, direct the computing system to perform steps comprising computing the distances from the first node to other nodes in the graphical structure.

* * * * *